(12) United States Patent  
Wu

(10) Patent No.: US 8,388,236 B2  
(45) Date of Patent: Mar. 5, 2013

(54) OPTICAL FIBER CONNECTOR AND RELATED OPTICAL FIBER CONNECTOR ASSEMBLY

(75) Inventor: Kun-Chan Wu, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 253 days.

(21) Appl. No.: 12/954,617

(22) Filed: Nov. 25, 2010

(65) Prior Publication Data

US 2012/0093464 A1  Apr. 19, 2012

(30) Foreign Application Priority Data

Oct. 15, 2010  (TW) .............................. 99135145 A

(51) Int. Cl.  
  G02B 6/38  (2006.01)  
  G02B 6/36  (2006.01)

(52) U.S. Cl. ................ 385/74; 385/53; 385/55; 385/56; 385/58; 385/59; 385/60; 385/64; 385/70; 385/71; 385/72; 385/73; 385/76; 385/77; 385/78; 385/82

(58) Field of Classification Search .................... 385/64, 385/74, 82  
See application file for complete search history.

(56) References Cited

U.S. PATENT DOCUMENTS

| 5,339,376 | A  | * | 8/1994  | Kakii et al. ...................... 385/71 |
| 6,035,664 | A  | * | 3/2000  | Hashizume ....................... 65/36 |
| 7,824,110 | B2 | * | 11/2010 | Rosenberger et al. .......... 385/74 |
| 7,985,026 | B1 | * | 7/2011  | Lin et al. ......................... 385/71 |

* cited by examiner

*Primary Examiner* — Ryan Lepisto  
(74) *Attorney, Agent, or Firm* — Altis Law Group, Inc.

(57) ABSTRACT

An optical fiber connector assembly includes a female connector, a male connector, and a thin film filter. The female connector includes a first main body and a first lens portion. The first main body and the first lens portion are made of a same polymer material having a lower melting point and higher fluidity than polyether-imide. The male connector is used for insertion into the female connector and includes a second main body and a second lens portion for optically coupling with the first lens portion. The second main body and the second lens portion are made of a same polymer material having a lower melting point and higher fluidity than polyether-imide. The thin film filter is formed on each of the first and second lens portions. A related optical fiber connector is also disclosed.

7 Claims, 4 Drawing Sheets

OPTICAL FIBER CONNECTOR AND RELATED OPTICAL FIBER CONNECTOR ASSEMBLY

BACKGROUND

1. Technical Field

The present disclosure relates to an optical fiber connector and a related optical fiber connector assembly.

2. Description of Related Art

Optical fiber connectors are widely used as an interface for high-speed transmission of electronic data between a computer host and a computer peripheral apparatus, such as a scanner, a digital camera, a mobile phone, a music player, and others. The optical fiber connector often includes a female connector and a male connector respectively having a main body, at least two optical lenses protruding from the main body, and at least two optical fibers accommodated in the main body. When in use, the male connector is received in the female connector, the at least two lenses of the female connector each couple with a corresponding lens of the male connector, and electronic data is transmitted.

However, the main body and the lenses of the female connector and the male connector are often polyether-imide (PEI) resin in a unitary piece formed by injection molding. Since the PEI has low fluidity and high melting point, in actual fabrication, high grade injection molding machine and peripheral apparatus are required for melting the PEI resin. In addition, PEI resin is expensive. These factors combine to increase costs. Therefore, it is necessary to provide an optical fiber connector and a related optical fiber connector assembly that can address the limitations described.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present optical fiber connector and a related optical fiber connector assembly are now described in detail and with reference to the drawings.

Figure 1:
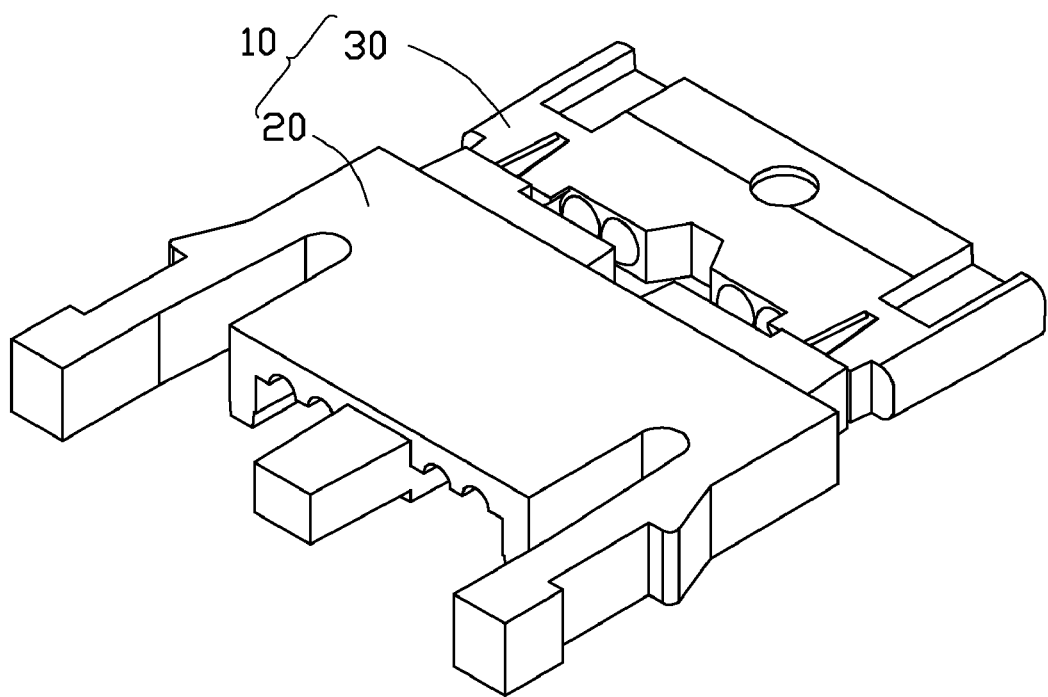
FIG. 1 is an isometric assembled view of an optical fiber connector assembly in accordance with an exemplary embodiment, the optical fiber connector assembly including a female connector and a male connector.
Figure 2:
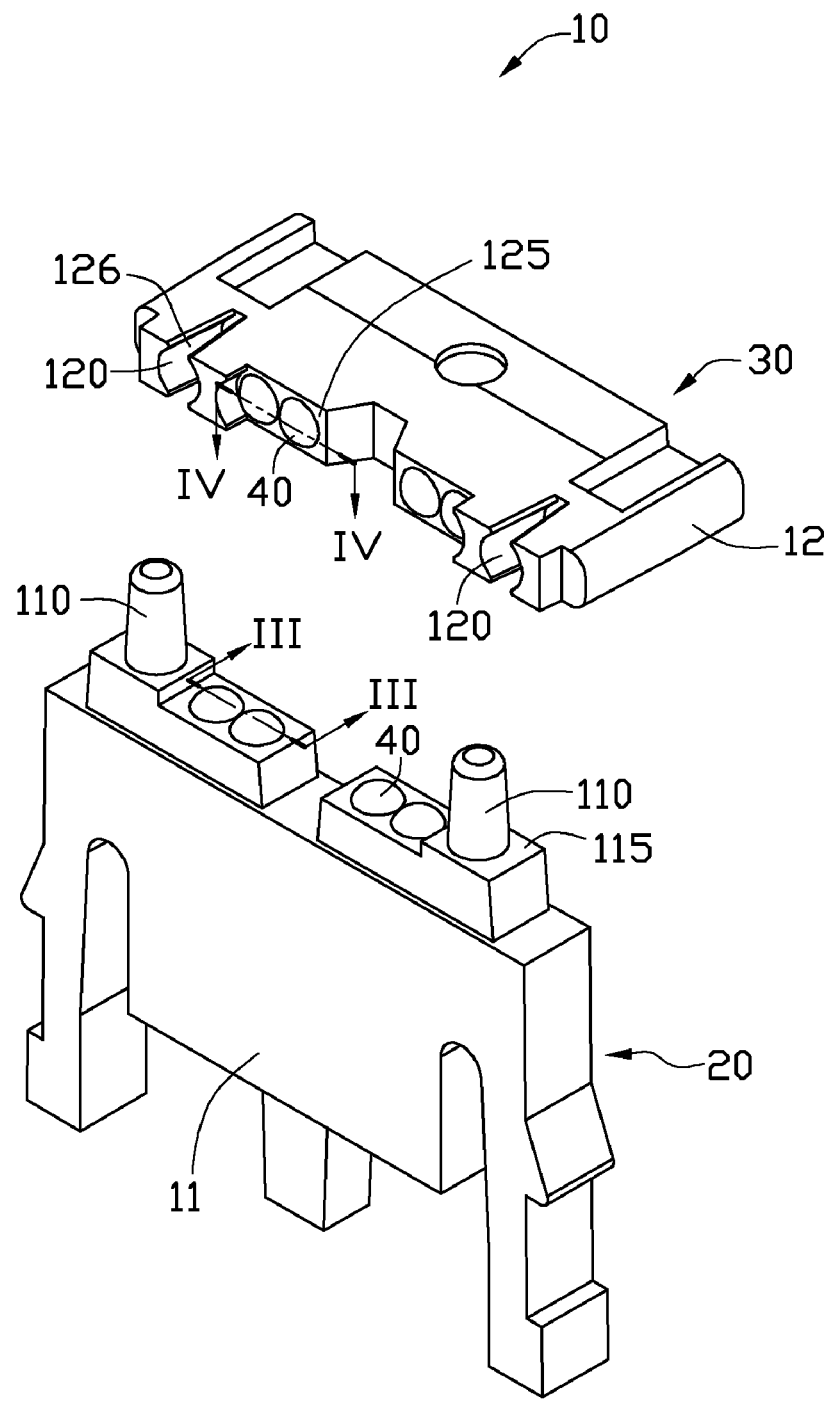
FIG. 2 is a disassembled view of the optical fiber connector assembly of FIG. 1.

Referring to FIGS. 1 to 2, an optical fiber connector assembly 10 according to an exemplary embodiment of the present disclosure includes a female connector 30 and a male connector 20 insertably received in the female connector 30. The female connector 30 is generally assembled in a host computer, and the male connector 20 is portable and configured for insertion into the female connector 30 such that data is transmitted between the host computer and the computer peripheral apparatus.

In detail, the male connector 20 encompasses a first main body 11, four first lens portion 13, and four first optical fibers 111. The first main body 11 includes a first end surface 115 and two protrusions 110. The four first lens portion 13 and the two protrusions 110 protrude from the first main body 11 at the first end surface 115. Each first lens portion 13 includes a first optical surface 131 and a first coupling surface 132 opposite to the first optical surface 131. The two protrusions 110 are respectively formed beside the two first lens portion 13. Each protrusion 110 is a truncated cone shape, with a diameter thereof gradually decreasing away from the first end surface 115.

The first main body 11 and the first lens portion 13 are transparent plastic in a unitary piece formed by common injection molding. The transparent plastic has lower melting point and better fluidity than the PEI resin. Those with ordinary skill in the present art can select and utilize suitable transparent material to manufacture the first main body 11 and the first lens portion 13 according to individual needs. For instance, the transparent plastic can be Polymethyl methacrylate (PMMA), Polycarbonate (PC) or uncrystallized polypropylene (PP).

The female connector 30 has a configuration substantially similar to the male connector 20. In detail, the female connector 30 includes a second main body 12, four second lens portion 14, and four second optical fibers 121. The second main body 12 includes a second end surface 125 and two positioning slits 120. The four second lens portion 14 protrudes from the male connector 11 at the second end surface 125. Each second lens portion 14 includes a second optical surface 141 and a second coupling surface 142 opposite to the second optical surface 141. The two positioning slits 120 are defined from the second end surface 125 towards an inner portion thereof and beside the distal two second lenses 14. Each of the two positioning slits 120 is configured for fittingly receiving a corresponding protrusion 110.

The second main body 12 and the second lens portion 14 are of transparent plastic in a unitary piece formed by standard injection molding. The transparent plastic has lower melting point and better fluidity than the PEI resin. Those of ordinary skill in the art can select and utilize suitable transparent resin to manufacture the second main body 12 and the second lenses 14 according to individual needs. For instance, the transparent plastic can be Polymethyl methacrylate (PMMA), Polycarbonate (PC) or uncrystallized polypropylene (PP). The four second optical fibers 121 are accommodated in the second main body 12 without contacting each other. Each of the second optical fibers 121 is optically coaxial and separated from a corresponding second lens portion 14 and focused with the second lens portion 14.

Figure 3:
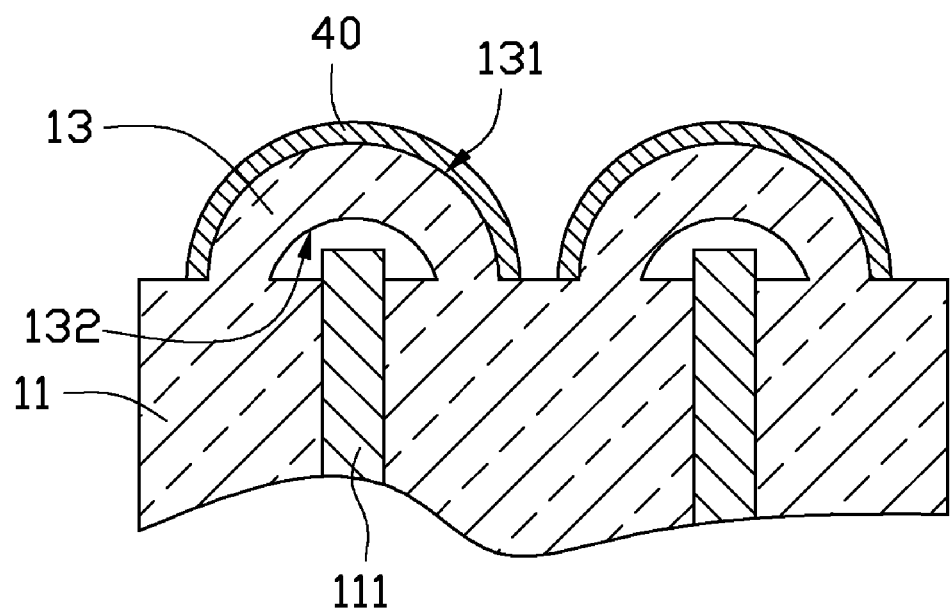
FIG. 3 is a cross-sectional view of the male connector of FIG. 1, taken along line III-III.
Figure 4:
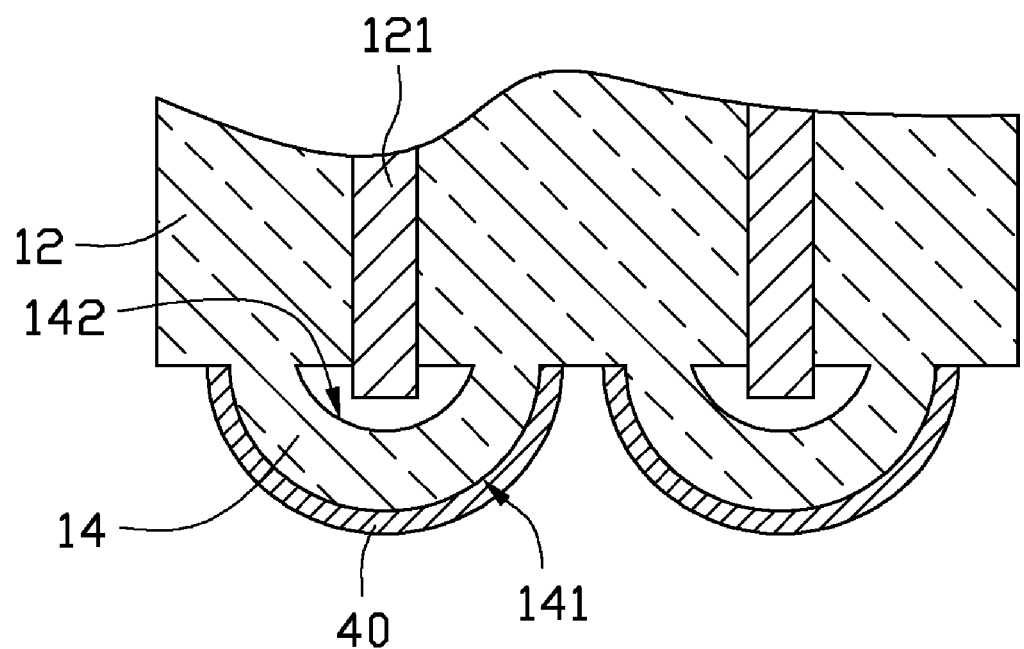
FIG. 4 is a cross-sectional view of the female connector, taken along line IV-IV.

Referring to FIGS. 2 to 4, a thin transparent film filter 40 is formed on the first optical surface 131 of each first lens portion 13 and the second optical surface 141 of each second lens portion 14. Taking the first and second lens portion 13, 14 made of PMMA for example, when the first and second optical fibers 111, 121 employ light beams having 850 nm wavelength as a transmitting medium, a thickness of the transparent film filter 40 can range from about 1 to 3 µm, and the transparent film filter 40 can consist of a successively laminated silicon dioxide film layer, a trititanium pentoxide film layer and a thallium pentoxide film layer. The four first optical fibers 111 are accommodated in the first main body 11, and the four second optical fibers 121 are accommodated in the second main body 12. Each of the first optical fibers 111 is optically coaxial with a corresponding first lens portion 13 with one end thereof adjacent to the first coupling surface 132 and focused with the first lens portion 13. Each of the second optical fibers 121 is optically coaxial with a corresponding second lens portion 14 with one end thereof adjacent to the second coupling surface 142 and focused with the second lens portion 14. Each first optical fiber 111 and second optical fiber 121 has a structure similar to a standard optical fiber, including an inner core for transmitting signals, an outer insulated layer, and an intermediate glass fiber.

Additionally, to resist abrasion, a coating layer can be respectively formed on the protrusions 110 and an inner surface 126 of the second main body 12 in the positioning slits 120.

When in use, the positioning slits 120 receive the protrusions 110, and the first optical fiber 111 is coaxially coupled with the second optical fiber 121 through the first lens portion 13 and the second lens portion 14. In this manner, optical signals can be transmitted between a host computer and a computer peripheral apparatus. In detail, the first optical fiber 111 transmits the signals from the host computer to the first lens portion 13, the first lens portion 13 spreads the signals, the second lens portion 14 straightens the signals, and the second optical fiber 121 receives the signals and transmits them into the computer peripheral apparatus. It is understood that signals are simultaneously transmitted from the computer peripheral apparatus to the host computer.

A method for manufacturing optical fiber connector follows.

First, the first main body 11 and the first lens portion 13, the second main body 12 and the second lens portion 14 are respectively formed with a transparent resin in a unitary piece by standard injection molding. The transparent resin has lower melting point and better fluidity than the PEI resin. One of ordinary skill in the art can select and utilize suitable transparent resin to manufacture the second main body 12 and the second lenses 14 according to individual needs. For instance, the transparent resin can be Polymethyl methacrylate (PMMA), Polycarbonate (PC) or uncrystallized polypropylene (PP). It is understood that the transparent resin is lower in cost than PEI resin, and compared with melting PEI resin, lower temperature is desired. Therefore, a standard injection molding machine and a standard peripheral apparatus in the art can be used in the present embodiment.

The transparent film filter 40 is formed on the first optical surface 131 and the second optical surface 132 using a standard coating method, such as a reactive sputtering or a chemical deposition.

The first optical fibers 111 are assembled into the first main body 11 with one end thereof coaxially adjacent to the first coupling surface 132 and focused with the corresponding first lens portion 13. The second optical fibers 121 are assembled into the second main body 12 with one end thereof coaxially adjacent to the second coupling surface 142 and focused with the corresponding second lens portion 14.

A coating layer resisting abrasion can be respectively formed on the protrusions 110 and the inner surface of the second main body 12 defined in the positioning slits 120.

The method as disclosed employs less costly material and standard injection molding machine and peripheral apparatus for manufacturing the optical fiber connector. Therefore, costs are reduced.

The described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. An optical fiber connector assembly, comprising:
    a female connector including a first main body and a first lens portion, the first main body and the first lens portion comprised of a same polymer material having a lower melting point and higher fluidity than polyether-imide;
    a male connector for insertion into the female connector including a second main body and a second lens portion for optically coupling with the first lens portion, the second main body and the second lens portion comprised of a same polymer material having a lower melting point and higher fluidity than polyether-imide;
    two optical fibers respectively received in the first and second main bodies and respectively optically coupled with the first and second lens portions; and
    a thin transparent film filter formed on each of the first and second lens portions, and when the optical fibers employ light beams having 850 nm wavelength as a transmitting medium, a thickness of the transparent film filter ranges from about 1 to 3 μm.

2. The optical fiber connector assembly of claim 1, wherein the male connector comprises two protrusions extending from the second main body at opposite sides of the second lens portion, the female connector comprises two positioning slits defined in the first main body arranged at opposite sides of the first lens portion, each protrusion configured for engageably insertion into a corresponding positioning slit.

3. The optical fiber connector assembly of claim 2, wherein an anti-abrasive coating is formed on the protrusions and inner surfaces of the female connector in the positioning slits.

4. The optical fiber connector assembly of claim 1, wherein both the first lens portion and the second lens portion are formed with a transparent resin, the transparent resin is selected from a group consisting of polymethyl methacrylate, polycarbonate and uncrystallized polypropylene.

5. The optical fiber connector assembly of claim 1, wherein the transparent film filter is selected from a group of consist of a trititanium pentoxide film layer and a thallium pentoxide film layer.

6. An optical fiber connector, comprising:
    a main body;
    a lens portion formed on the main body;
    a thin transparent film filter formed on the lens portion;
    an optical fiber received in the main body and optically coupled with the lens portion; the main body and the lens portion made of a same polymer material having lower melting point and higher fluidity than polyether-imide; and when the optical fiber employs light beams having 850 nm wavelength as a transmitting medium, a thickness of the transparent film filter ranges from about 1 to 3 μm.

7. The optical fiber connector of claim 6, wherein the transparent film filter is selected from a group of consist of a trititanium pentoxide film layer and a thallium pentoxide film layer.

* * * * *